July 6, 1937.　　　D. B. TOLLEY　　　2,086,341
POULTRY FOUNTAIN
Filed Jan. 31, 1936
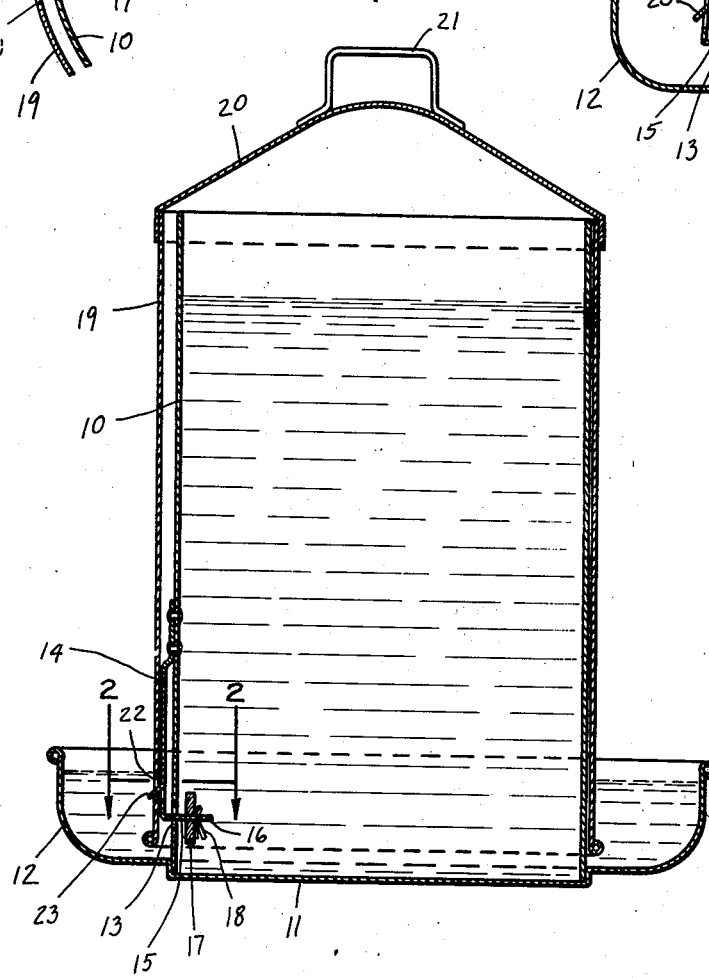
INVENTOR.
DONALD B. TOLLEY.
BY
Lockwood Goldsmith & Galt
ATTORNEYS.

Patented July 6, 1937

2,086,341

UNITED STATES PATENT OFFICE 2,086,341

POULTRY FOUNTAIN

Donald B. Tolley, Kokomo, Ind., assignor to Globe American Corporation, Kokomo, Ind., a corporation Application January 31, 1936, Serial No. 61,764

4 Claims. (Cl. 119—77)

This invention relates to a watering device for poultry commonly known as a "fountain", wherein there is provided a reservoir for a quantity of water which maintains a predetermined level in a surrounding drinking pan.

The object of this invention is to provide a type of container of this character which may be filled at the top, as distinguished from the usual inverted jar fountains. In such top-filled fountains there is provided a water container having the lower portion thereof surrounded by an exteriorly exposed drinking pan apertured near its bottom and sealed by a cover projecting below the desired level of the water in the pan. Thus, the container, water sealed by the cover, automatically maintains the water level of the pan at the height of the feeding aperture.

In such structure there is employed an automatic valve for opening and closing the aperture through which water passes from the container to the outer pan in such a fashion that when the cover is inserted over the container to extend downwardly below the water lever, it automatically opens the valve to permit free passage of water from the container to the pan, but when the cover is removed, the valve is automatically closed so as to prevent free passage of water through the opening, such as would overflow the pan by reason of breaking the water seal effected by the cover.

The feature of this invention resides in utilizing the valve structure for locking the cover in water sealing position over the container so that it may not be accidentally displaced and will also permit of lifting the entire fountain by means of a handle on the top of the cover. At the same time, by merely turning the cover with respect to the container or manually actuating the latching device, the cover may be unlocked and readily removed. But upon removal thereof, as above remarked, the valve will automatically close to prevent overflow.

The full nature of the invention will be understood from the accompanying drawing and the following description and claims:

Fig. 1 is a central vertical section through the fountain showing the cover locked in water sealing position with the valve open. Fig. 2 is a section taken on the line 2—2 of Fig. 1. Fig. 3 is a fragmental section, as in Fig. 1, showing the cover removed and the valve closed.

In the drawing there is illustrated a cylindrical water container 10 having an upright wall open at the top and closed by the bottom 11 of the drinking pan 12. An aperture or water passage 13 is provided in the side wall of the container adjacent the bottom of the pan 12 and preferably below the desired water level to be maintained therein.

Secured to the side wall of the container directly above the aperture 13 there is a spring arm 14 which extends downwardly, spaced from the wall of the container and terminating in an inwardly-extending projection 15 having a reduced portion 16 therein. Said projection extends through the aperture 13 and has mounted thereon within the container a valve 17 supported by the reduced portion 16 and held in position against the shoulders of the projection 15 by a cotter pin 18. The inherent spring tension of the arm 14 normally holds the valve 17 in water sealing position against the inner surface of the wall of the container for closing the aperture and sealing it against passage of water therethrough, as illustrated in Fig. 3.

After filling the container, the cover 19, which is of slightly larger diameter and extends the substantially full height of the container, is mounted thereover. Said cover is provided with an open bottom adapted to extend into the pan 12 close to the bottom thereof when mounted in position. The upper end of the cover is closed and sealed by the sloping top 20 having a handle 21 mounted centrally thereof. Adjacent the lower edge of the cover and at a position at which it is desired to maintain the water level in the pan 12 when the cover is mounted in position, there is provided an aperture 22 to provide a shoulder adapted to be engaged by a curved lip 23 formed in the spring arm 14, said spring arm and lip providing a latch for interlocking with the aperture 22 and holding the cover in water sealing position.

When the cover is mounted over the container, as illustrated in Fig. 1, the diameter thereof with respect to the container is such that it engages the spring arm 14 and presses it inwardly toward the wall of the container, thus forcing the valve 17 from the aperture 13 to permit the water to readily pass therethrough into the pan 12. The water will then pass from under the cover or through the aperture 22 therein and seek the level of such aperture. But owing to the water seal, the water level in the pan will not rise materially above the aperture 22.

As is well understood, as the chicks proceed to use the water in the pan, the level therein will be maintained until the water in the container is exhausted.

By reason of the cover being latched on the container, through the medium of the lip 23 and arm 14, the entire fountain may be lifted and moved about through the handle 21 without disturbing its function. When it is desired to fill the container, the pan may be held with one hand, and through the handle 21 the cover slightly rotated so that the curved outer edge of the lip 23 will be engaged and forced inwardly by the cover to unlatch it from the aperture 22, as illustrated in Fig. 2. Thereupon the cover may be readily lifted from the container, whereupon the arm 14 will be released to close the valve 17 so that any higher level of water in the container will not cause overflow of the pan. After filling, during which the valve will prevent passage of water from the container to the pan by reason of its closed position, shown in Fig. 3, the cover may be replaced over the container, so as to open the valve and be latched in position by the lip 23, whereupon water will immediately flow into the pan to the desired level.

The invention claimed is:

1. A drinking fountain comprising a container, a drinking pan associated with said container, said container being open at the top and provided with an aperture adjacent the bottom, a valve for controlling the passage of fluid through said aperture, a sealing cover for said container having an aperture therein, a spring arm mounted on said container for normally maintaining said valve in closed position, and a projection on said arm adapted to be engaged with the aperture in the cover for latching it in sealing position while permitting removal thereof.

2. A drinking fountain comprising a fluid containing member, a drinking pan associated therewith, said containing member being open at the top and communicating with said drinking pan at the bottom, a cover member slidable over said fluid containing member with the bottom thereof extending into said pan, one of said members having a latch engaging shoulder on the wall thereof, and a spring latch on the other member adapted to slidably engage said shoulder under spring tension for removably locking said members together.

3. A drinking fountain comprising a fluid containing member, a drinking pan associated therewith, said containing member being open at the top and communicating with said drinking pan at the bottom, a cover member slidable over said fluid containing member with the bottom thereof extending into said pan, one of said members having a latch engaging shoulder on the wall thereof, a spring arm secured to the wall of the other member and extending between the respective walls of said members, and a latching projection on said arm for engagement with said shoulder, said projection being so formed as to prevent separation of said members when in latching position and permitting relative movement thereof to unlatching position.

4. A drinking fountain comprising a fluid containing member, a drinking pan associated therewith, said containing member being open at the top and communicating with said drinking pan at the bottom, a cover member slidable over said fluid containing member with the bottom thereof extending into said pan, one of said members having a latch engaging shoulder on the wall thereof, a spring arm secured to the wall of the other member and extending between the respective walls of said members, a valve mounted on said arm for controlling the passage of fluid from the fluid containing member to the pan and normally held in closing position by the spring tension of said arm, and a latching projection on said arm for engagement with said shoulder to prevent separation of said members when in latching position and to permit relative movement thereof to unlatching position.

DONALD B. TOLLEY.